United States Patent [19]
Komoto

[11] Patent Number: 5,115,877
[45] Date of Patent: May 26, 1992

[54] ELECTRONIC BALANCE
[75] Inventor: Akira Komoto, Okumachi, Japan
[73] Assignee: Shimadzu Corporation, Kyoto, Japan
[21] Appl. No.: 560,172
[22] Filed: Jul. 31, 1990
[30] Foreign Application Priority Data
  Jul. 31, 1989 [JP] Japan .................. 1-199748
[51] Int. Cl.[5] .............................. G01G 7/02
[52] U.S. Cl. .............................. 177/212
[58] Field of Search .......................... 177/212

[56] References Cited
U.S. PATENT DOCUMENTS
4,245,711  1/1981  Kunz .................. 177/212
4,487,279 12/1984  Komoto ............... 177/212

Primary Examiner—George H. Miller, Jr.
Attorney, Agent, or Firm—Koda and Androlia

[57] ABSTRACT

An electronic counter having an electronic force transducer operated with a plurality of pulse currents.

7 Claims, 5 Drawing Sheets

ELECTRONIC BALANCE

BACKGROUND OF THE INVENTION

The present invention relates to a precision electronic balance made up essentially of a servo system containing therein an electromagnetic force transducer which produces a force to counterbalance weight of a body or bodies to be weighed.

In this type of electronic balance, the electromagnetic force transducer is made operative either with a stationary DC current or with a pulse current, and the weight is determined by a "balancing current" being supplied to the force transducer when the servo system is brought into and kept at an equilibrium state. If the balancing current is a stationary DC current, its magnitude corresponds to the weight, while, if the balancing current is a pulse current, its duty factor or pulse width gives the weight.

With a stationary DC current used, precision measurement of the current necessiates a high-resolving A-D conversion system, because the measurement is made through a process of digitalizing the magnitude of the current. The use of a high-resolving A-D conversion system not only increases the cost of the balance but also generally makes it take a relatively long time to complete one operation of weight measurement. Further, the whole servo system is necessarily kept very stable for that long time needed for the measurement.

In the case where the force transducer is operated with a pulse current, its duty factor is varied to counterbalance the weight, and the weight is determined by measuring the pulse width giving the duty factor. The measurement is made by counting the number of clock pulses contained in the time interval equal to the pulse width. In this case, the pulse current must have its period kept at 2 milliseconds or shorter to avoid a possible vibrational motion of the balance. Therefore, with a 30-MHz clock used, the number of clock pulses countable within the pulse width is restricted to 60,000 (16 bits) at the largest, failing to give a precision highly resolved value of weight. This maximum countable number also corresponds to the ability of commercially avilable counter ICs. Although, for instance, Japanese Laid-open Patent Application No. 54-48277 proposes means for overcoming the drawback caused by the above limit imposed on the clock pulse counting, the technology disclosed therein contains a process of integration and makes the constitution of a balance disadvantageously complicated.

There is another improved method in which are provided both an additional servo system for fine adjustment and a plurality of pulse current sources for generating various pulse currents discontinuously different in width. Weight is first counterbalanced coarsely with one of the pulse currents, and then a residual value of the weight is finely offset through the additional servo system. This method also has a disadvantage that, when the weight loaded on the balance changes continually or suddenly as is experienced, for instance, in the process of weighing out some items, the balance often overswings owing to a possible temporary pulse-current misslection due to the response characteristics of PID control circuits employed in the servo system, causing a weight value display to wide fluctuate.

OBJECTS AND SUMMARY OF THE INVENTION

An object of the present invention is to provide an electronic balance improved both in the response speed and in the resolving power in comparison with the conventional electronic balances.

Another object of the present invention is constitute such an improved electronic balance so as to be also stable, as to the display of weight values, against external disturbances.

To achieve the above objects, the servo system in the electronic balance according to the present invention has its electromagnetic force transducer made operative with a plurality of pulse currents with their respective heights and duty factors different from one another. These different pulse currents cooperate to fractionally offset the total value of weight to be measured. Further, the display of measured weight value can be devised so as to display the values according only to the output from the integral circuit part of a PID control circuit, which is a constituent of the servo mechanism.

BRIEF DESCRIPTION OF THE DRAWINGS

The present invention is described in further detail in the following on reference to the accompanying drawings, in which.

DETAILED DESCRIPTION OF THE INVENTION

Figure 1:
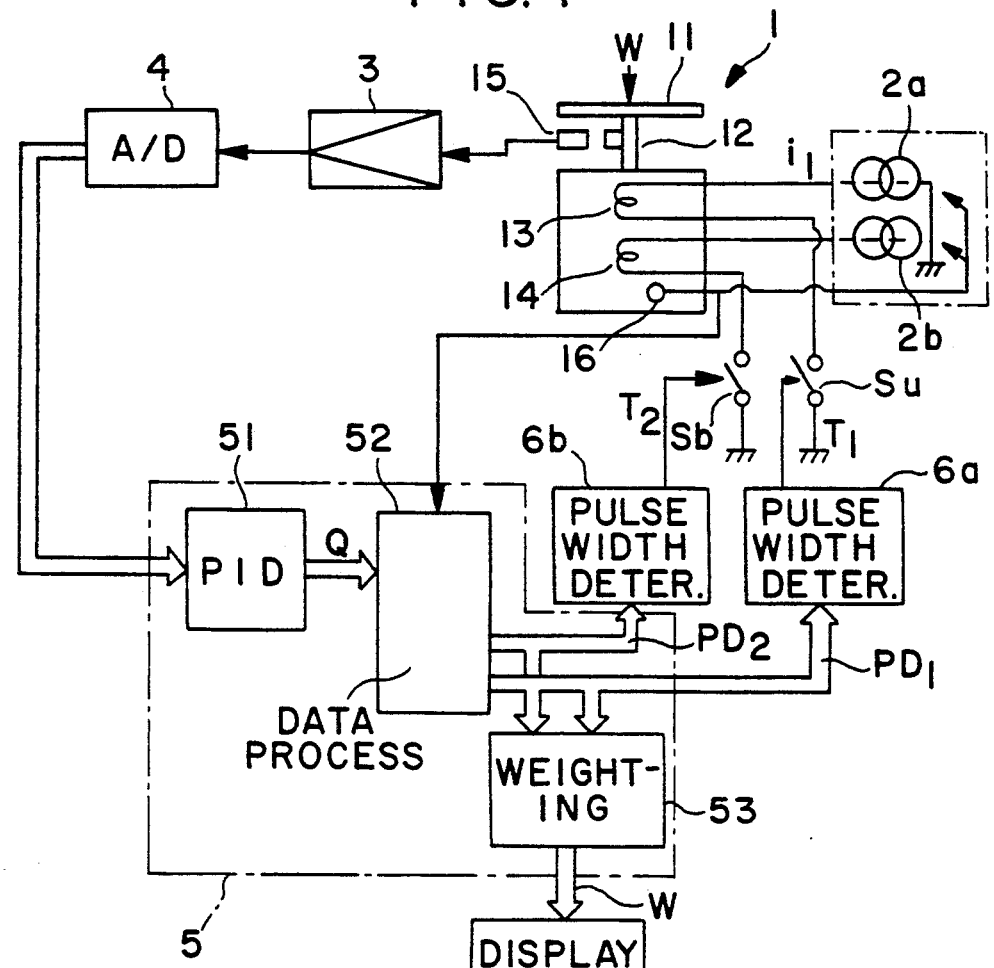
FIG. 1 shows a blockdiagrammatical constitution of an embodiment of the present invention.

Referring to FIG. 1, an electronic balance as an embodiment of the present invention has its electromagnetic force transducer 1 provided with two force coils 13 and 14 having mechanical connection with a weighing pan 11 through a pan support 12. The force coils 13 and 14 are current-supplied respectively from DC current sources 2a and 2b through switching means Sa and Sb: the DC current sources 2a and 2b generate DC currents $i_1$ and $i_2$, respectively; and the switching means Sa and Sb are operated by pulse width control circuits 6a and 6b, respectively. The force coils 13 and 14 are thus supplied with their respective pulse currents different in pulse height and duty factor from each other. On the other hand, the weighing pan 11 has its displacement detected as an electric signal by a displacement sensor 15 and inputted to an analog-to-digital (A-D) converter 4 through an amplifier 3. The displacement of the weighing pan 11 loaded with a weight thereon is thus digitalized and then inputted to a digital PID circuit 51, which outputs a displacement data Q about the displacement of the weighing pan 11. The operation of a PID circuit is known, and therefore, its description is omitted here. The displacement data Q is given by:

$$Q = Px + Ix + Dx = K_1 x_n + (I_{(x)} + K_2 x_n) K_3(x_n - x_{n-1}),$$

where $x_n$ is the difference between a predetermined reference value $x_0$ and a displacement value x outputted from the A-D converter 4; $I_{(x)}$ is a previous integral output; and $K_1$, $K_2$ and $K_3$ are constant.

The displacement data Q is inputted to a data processing circuit 52, which produces two pulse width determining digital signals $PD_1$ and $PD_2$ corresponding respectively to two higher and lower ranking parts of the data Q. In producing PD1 and PD2 according to the displacement Q, however, it is desirable to make a moving average operation on Q each time. These pulse width determining signals $PD_1$ and $PD_2$ are transferred respectively to the previously mentioned pulse width control circuits 6a and 6b, which control the switching means Sa and Sb so that they are switched on only for time periods $T_1$ and $T_2$ in proportion respectively to $PD_1$ and $PD_2$. Incidentally, the electromagnetic force transducer 1 has its temperature-dependent characteric compensated by controlling the DC current sources 2a and 2b with the output from a temperature sensor 16 attached to the force transducer 1.

In this way, each time the A-D converter 4 outputs a weighing-pan displacement signal at a predetermined sampling time interval T of, for example, 1 millisecond, the two force coils 13 and 14 of the force transducer 1 are supplied with respective pulse currents different in pulse height and duty factor. Their respective pulse heights are $i_1$ and $i_2$, while the duty factors are given respectively by $T_1/T$ and $T_2/T$. In conjunction with $T_1$ and $T_2$, it is essential that the extreme available values of $PD_1$ and $PD_2$ are related so that the effect of the largest $PD_2$ is equal to that of the smallest $PD_1$; namely, the force exerted by the force coil 13 supplied with a pulse current having the smallest pulse width is equal to the force by the force coil 14 supplied with a pulse current having the largest pulse width. It is, of course, allowable that the force coverages by the force coils 13 and 14 are partially overlapped at their marginal regions. As is understood from the above description, both the force coil 13 for a larger part of a load and the force coil 14 for a smaller part of the same load are simultaneously supplied with their respective pulse currents.

As to the display of weight, the above two pulse width determining digital signals $PD_1$ and $PD_2$ are led also to a weighting circuit 53, by which the signals $PD_1$ and $PD_2$ are weighted in proportion to their respective contributions to a total counterbalancing force produced by the force coils 13 and 14. The sum of the weighted $PD_1$ and $PD_2$ is time-averaged and then displayed on the display 7. The weighting circuits 53 can be constituted so as to have functions of zero-point compensation and tare subtraction.

In addition to the above described fundamentals of the present embodiment, a concrete example of the A-D converter 4 is briefed in the following.

Figure 2:
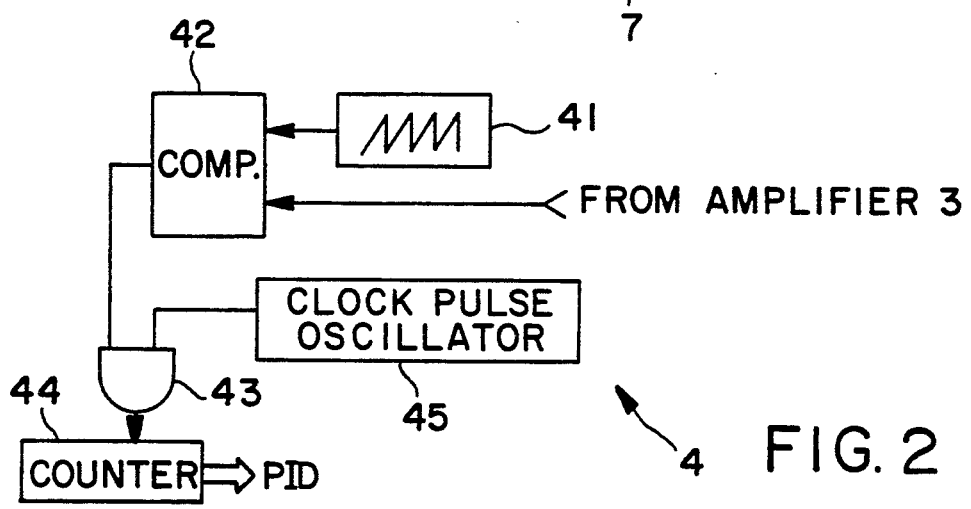
FIG. 2 shows an A-D converter usable in the present invention.

As shown in FIG. 2, the A-D converter 4 can be constituted, for example, with a sawtooth generator 41, a comparator 42, an AND gate 43, a counter 44 and a clock pulse generator 45. The comparator 42 compares a weighing-pan displacement signal from the amplifier 3 with the output from the sawtooth generator 41, and has its output kept at a high level while the output level of the sawtooth generator 41 is lower than the displacement signal from the amplifier 3. The clock pulses from the clock pulse generator 45 are made to pass the AND gate 43 with the comparator output used as a gate signal. The counter 44, which is reset by the fall-down edge of each sawtooth, counts the clock pulses coming out through the AND gate 43. In this way, digitalized displacement data are successively obtained at an time interval equal to the period of the sawtooth wave outputted from the sawtooth generator 41. The period of the sawtooth wave is 1 millisecond for instance.

Incidentally, in the above A-D converter shown in FIG. 2, if the period of the sawtooth wave is 1 millisecond and the frequency of the clock pulses is 30 MHz, the maximu number of clock pulses countable by the counter 44 is $3 \times 10^4$. On the other hand, in an electronic balance having a full scale capacity of 200 gram and a resolving power of 0.01 miligram, the maximum number of display counts reaches $2 \times 10^7$. In such a case, if the balance loaded with a weight corresponding to the above maximum number of $2 \times 10^7$ couts, the difference between $3 \times 10^4$ and a predetermined basic number is repeatedly multiplied by itself the displacement comes to be inversely directed. However, if the above mentioned difference is not large enough, the multiplication take a very long time. In such a case, the tiem needed for the multiplication can be made shorter by employing a non-linear control operation.

Incidentally, if a digital-output type sensor such as CCD line sensor is used for the displacement sensor 15, the A-D converter 4 can be omitted. Further, the number of pulse current generating means can be increased further without limiting to 2 as in the case of the present embodiment. This embodiment can be modified by using a force transducer having only one force coil, since a plurality of pulse currents can be supplied to one coil by superposing them on one another. It is needless to say that the DC pulse currents used in the above emodiment and its modification can be replaced with AC pulse currents.

Figure 3A:
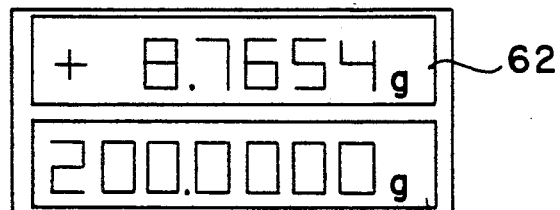
FIGS. 3(a) and 3(b) show examples of weight value display panels.
Figure 3B:
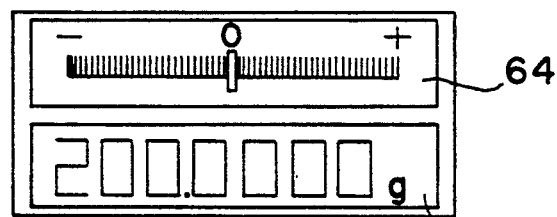

According to the idea of the present invention, the balance can be constituted so as to make the force produce, in advance, a force corresponding to an aiming value of weight by setting pulse width determining data through some means like a keyboard. Therefore, by using a so constituted balance in weighing-out operations, a difference between a weight and an aiming weight value is displayed as soon as the balance is loaded with the weight. The response speed of display is thus improved. Two display board examples of such abalance are shown in FIGS. 3(a) and 3(b). In FIG. 3(a) the difference is displayd digitally (62) above a digital disply of an aiming weight value (61), while FIG. 3(b) shows an example of analog display of the difference. The difference is displayed on display elements 64 arrayed above a digital display 63.

Figure 4:
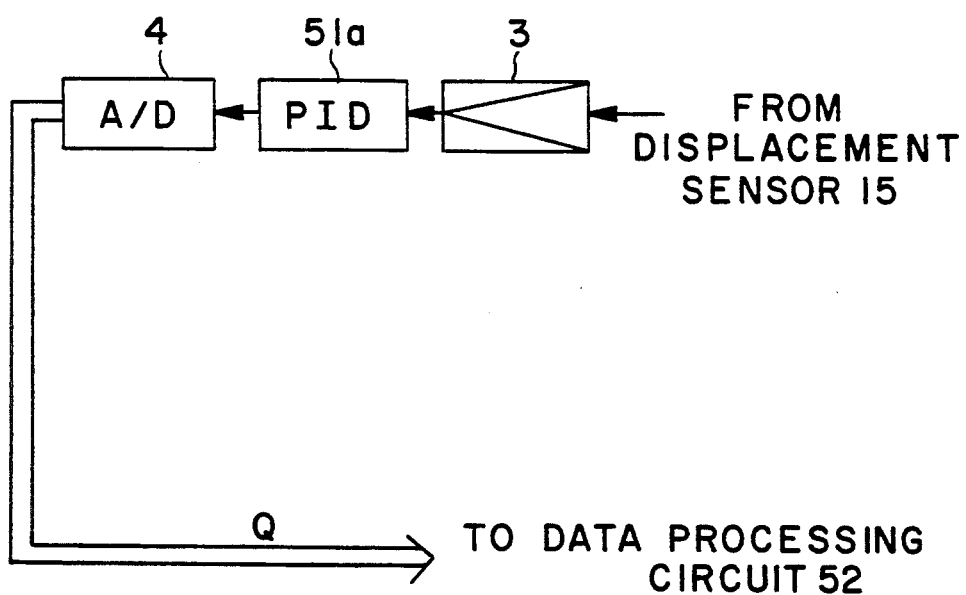
FIG. 4 shows a partial constitution of another embodiment of the present invention.

FIG. 4 shows a partial constitution of another embodiment of the present invention. In this embodiment the digital PID circuit 51 of FIG. 1 is replaced with an analog PID circuit 51a. Other constituents are the same as those of the embodiment shown in FIG. 1. According to this embodiment, since the micro-computerized part 5 (see FIG. 1) does not contain a digital PID circuit, the CPU (not shown) in the computerized part 5 is not required to operate so speedily.

Figure 5:
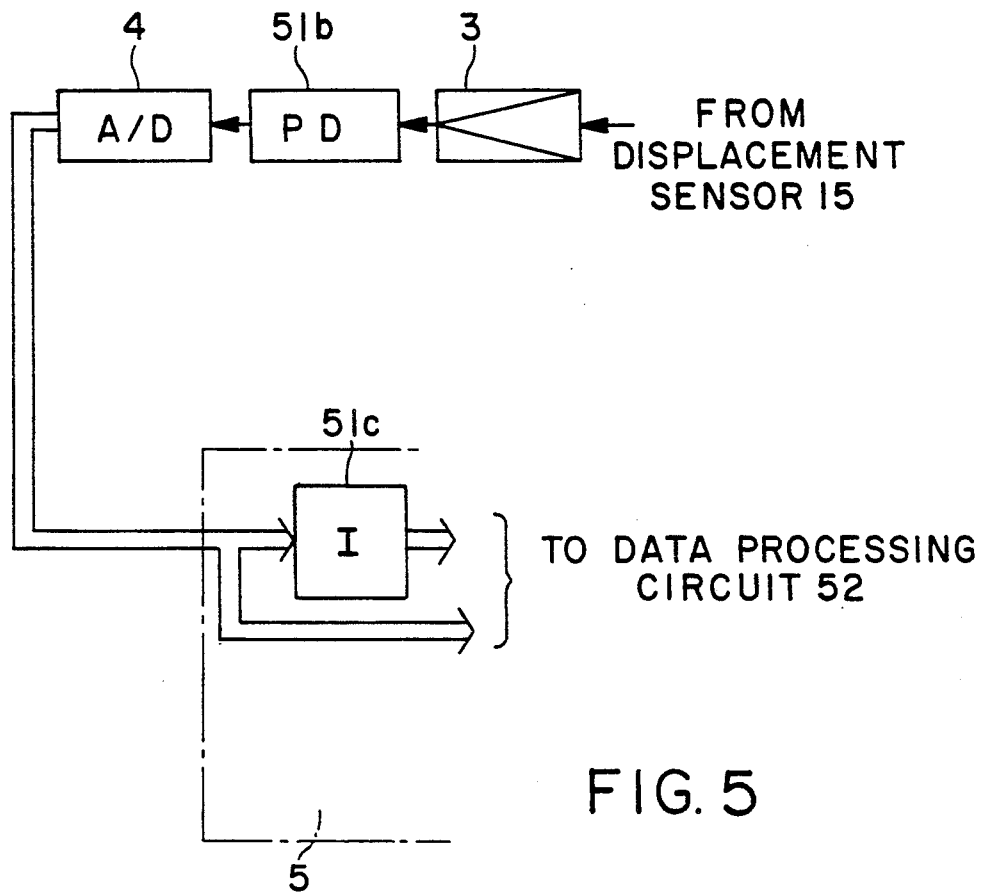
FIG. 5 shows a partial constitution of a further another embodiment of the present invention.

FIG. 5 shows a partial constitution of a further embodiment of the present invention. In this embodiment the PID circuit is divided into an analog PD circuit 51b and an digital I circuit 51c. Other constituents are the same as those of the embodiment shown in FIG. 1. This embodiment has an advantage that, since the integral operation is made after digitalization, the capacity of the A-D converter 4 may be relatively small.

Figure 6:
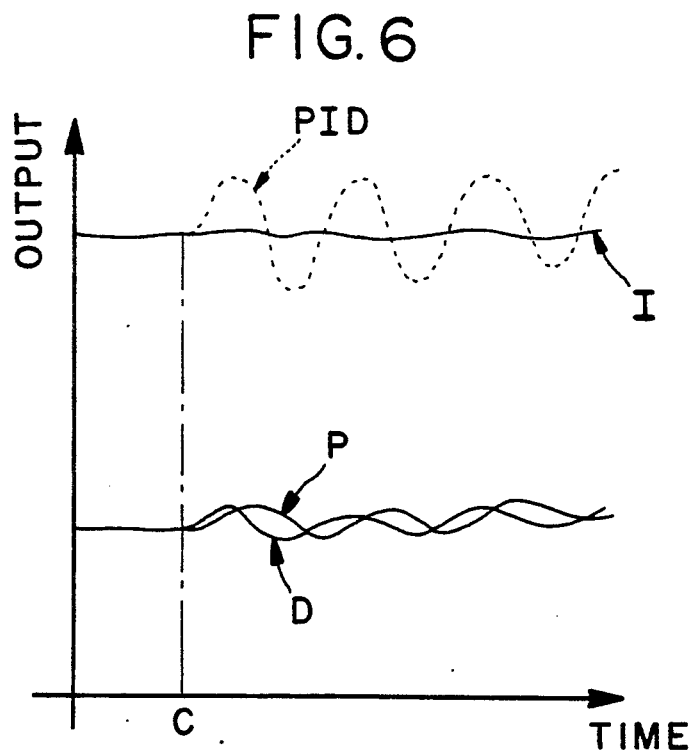
FIG. 6 is a graphical representation of the function of a PID circuit.
Figure 7:
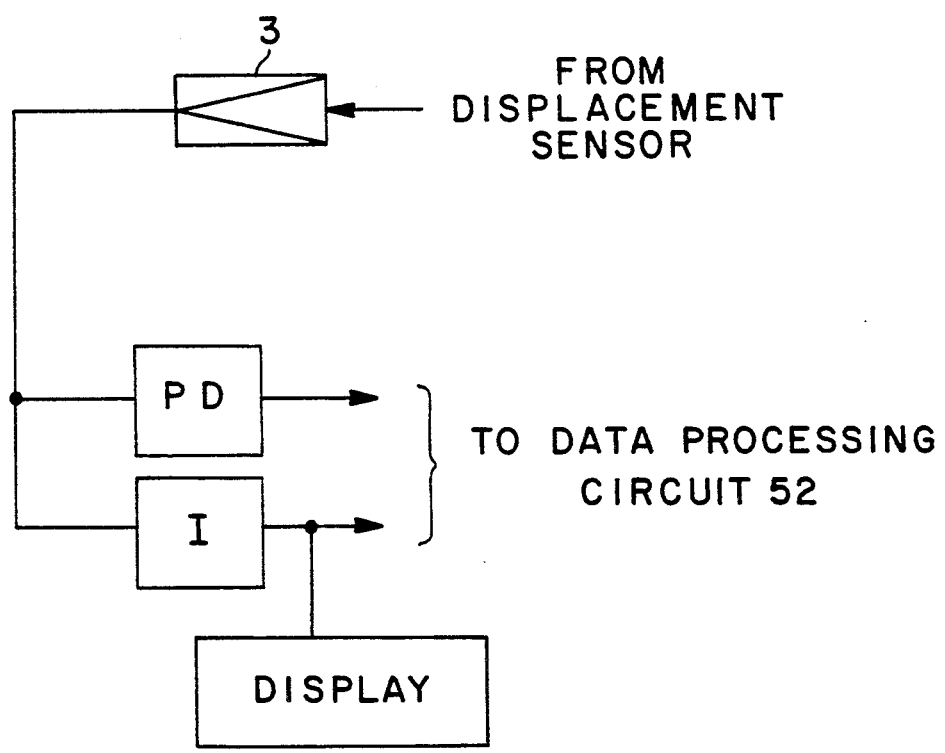
FIG. 7 shows a partial circuit modification applicable to all the embodiments of the present invention.

All of the above described ebodiments can be further modified to make their weight-value display kept stable against possible external disturbaces. In this modification the data for use in displaying a weight value is obtained only from the integral operation part of the PID circuit. FIG. 6 shows a typical PID response to a vibrational disturbance analytically. Of three components constituting a resultant PID response, the P (proportional) and D (differential) components sensitively respond to the disturbance, while the I (integral) component is relatively insentive. Therefore, a stable display can be achieved by displaying the weight value only with the output from the integral part of a PID control circuits. FIG. 7 is a block diagramatical representation of a PID control system according to this idea. Though the PID system is shown, in FIG. 7, as an analog system for showing only its fundamental constitution, it can easily be applied to all the preceding embodiments by digitalizing all or part of the system.

In the following are shown some examples of a weighing pan displacement sensor applicable to the present invention.

Figure 8A:
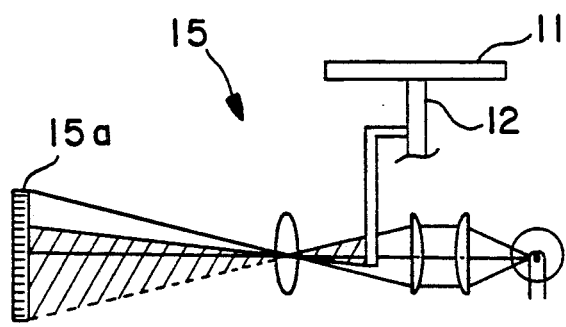
FIGS. 8(a), 8(b) and 8(c) show weighing pan displacement detectors.
Figure 8B:
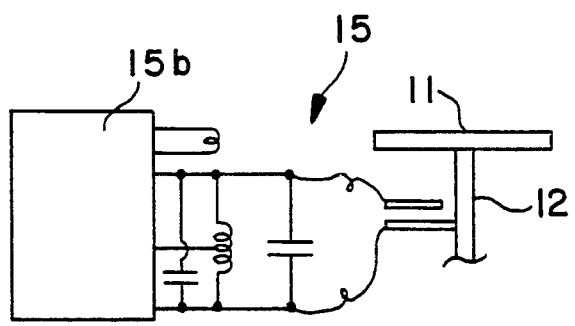
Figure 8C:
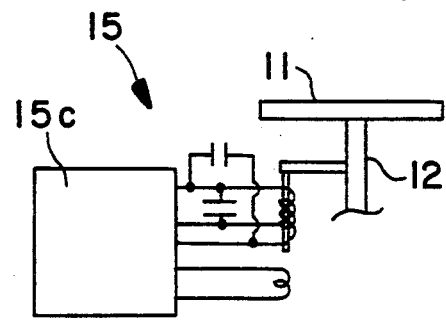

One example, as shown in FIG. 8(a), consists of a micro-photosensor assmbly 15a, an optical system projecting a diverging light beam on that assebly 15a and a shutter S fixed to the support 12 of the weighing pan 11 so as to partially intercept the light beam. As the shutter moves with the weighing pan 11, an irradiated area of the micro-photosensor assembly 15a varies to make a weighing pan displacement detected as an electric signal. Examples shown in FIGS. 8(b) and 8(c) make use of frequency changes of oscillators 15b and 15c. In FIG. 8(b) one electrode of the capacitor constituting the tank circuit of the oscillator 15b is fixed to the support 12 of the weighing pan 11, so that the frequency chanes capacitively with the movement of the weighing pan 11. In FIG. 8(c) a ferrite core movably inseted in the coil constituting the tank circuit of the oscillator 15c is fixed to the support 12 of the weighing pan 11, so that frequency varies inductively.

I claim:

1. An electronic balance devised so as to weigh a weight placed on a weighing pan by counterbalancing said weight with a force generated by an electromagnetic force transducer having its force coil assembly supplied with pulse currents having their duty factors controlled according to said weight, said electronic balance comprising:

a plurality of pulse current generating means for supplying pulse currents to said force coil assembly of said electromagnetic force transducer;

a displacement data outputting means for detecting a displacement of said weighing pan;

a PID operation means for performing PID operations on the output from said displacement data outputting means; and a data process part for giving a duty factor of the pulse current from each of said pulse current generating means by determining said duty factor from data corresponding to bits in a plurality of regions in accordance with the output from said PID operation means.

2. An electronic balance as defined in claim 1, wherein said displacement data outputting means is a digital displacement data outputting means.

3. An electronic balance as defined in claim 2, wherein said digital displacement data outputting means consists of an analog displacement sensor and an analog-to-digital converter.

4. An electronic balance as defined in claim 2, wherein said digital displacement data outputting means consists of a microphotosensor assembly and an optical system for partially light-irradiating said microphotosensor assembly in accordance with the displacement of said weighing pan, said microphotosensor assembly being made up of tightly arrayed microphotosensors.

5. An electronic balance as defined in claim 2, wherein said digital displacement data outputting means consists of an oscillator devised so as to oscillate at a frequency reflecting the displacement of said weighing pan.

6. An electronic balance as defined in claim 5, wherein said oscillator comprises a tank circuit whose capacitance is devised so as to vary in accordance with the displacement of said weighing pan.

7. An electronic balance as defined in claim 5, wherein said oscillator comprises a tank circuit whose reactance is devised so as to vary in accordance with the displacement of said weighing pan.

* * * * *